No. 795,856. PATENTED AUG. 1, 1905.
E. F. OSBORNE.
PRESSURE CONTROLLED VALVE.
APPLICATION FILED MAY 23, 1904.
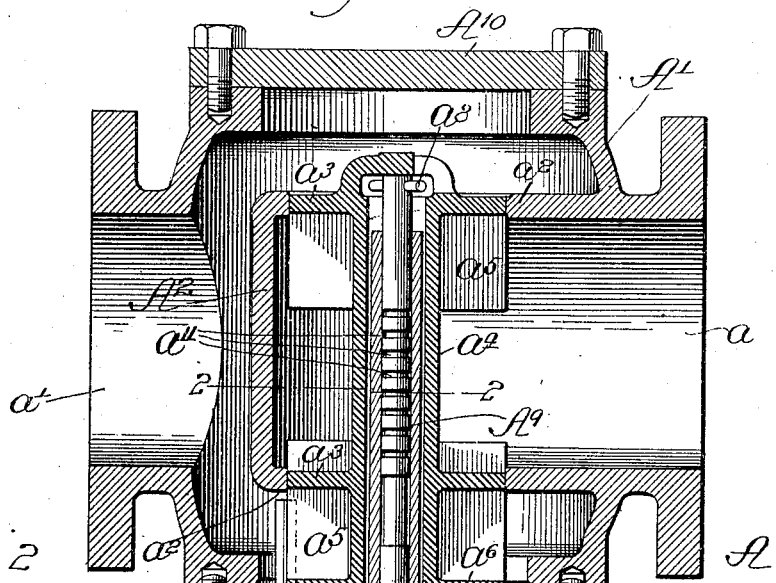
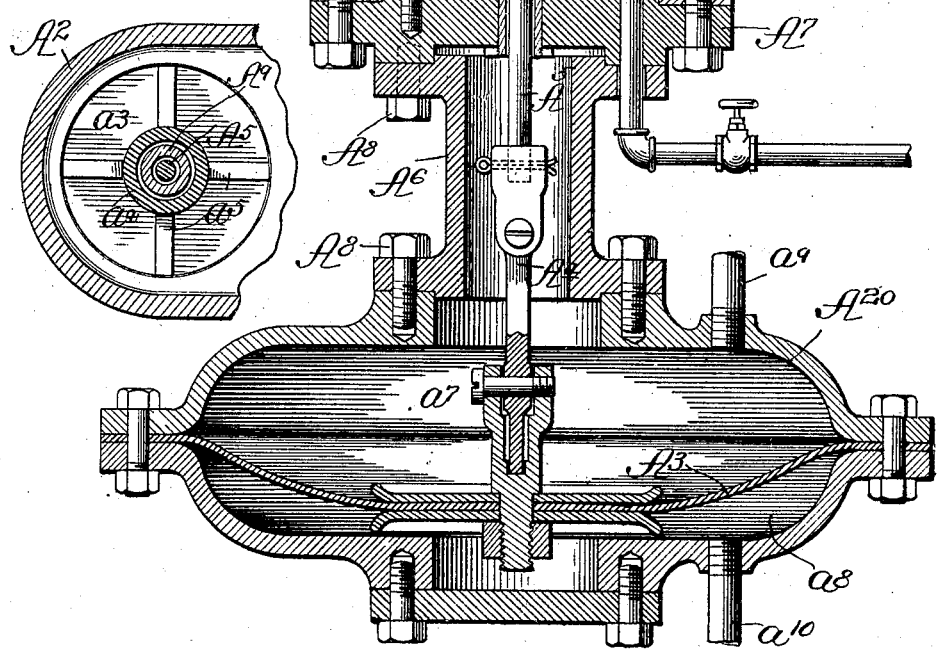
Witnesses:
Inventor:
Eugene F. Osborne.

UNITED STATES PATENT OFFICE.

EUGENE F. OSBORNE, OF CHICAGO, ILLINOIS, ASSIGNOR TO OSBORNE STEAM ENGINEERING COMPANY, OF CHICAGO, ILLINOIS, A CORPORATION OF ILLINOIS.

PRESSURE-CONTROLLED VALVE.

No. 795,856.     Specification of Letters Patent.     Patented Aug. 1, 1905.

Original application filed November 23, 1903, Serial No. 182,334. Divided and this application filed May 23, 1904. Serial No. 209,364.

*To all whom it may concern:*

Be it known that I, EUGENE F. OSBORNE, a citizen of the United States, and a resident of Chicago, in the county of Cook and State of Illinois, have invented certain new and useful Improvements in Pressure-Controlled Valves; and I do hereby declare that the following is a full, clear, and exact description thereof, reference being had to the accompanying drawings, and to the letters of reference marked thereon, which form a part of this specification.

This invention relates to improvements in valves which are more peculiarly adapted to valves of that class embracing, in combination with a valve-closure and its seat, a diaphragm or like device connected with the closure through the medium of a suitable stem and by which the opening and closing movements of the valve are regulated in accordance with the pressure above and below the diaphragm or equivalent device.

The invention relates more specifically to an improved packing for the stem of the valve-closure and constructed to prevent the passage of a fluid under pressure to or from the valve chamber or casing around the valve-stem.

A valve made in accordance with my invention may be employed for controlling the flow of any kind of fluid through a pipe or conduit or for reducing the pressure of a fluid passing through a pipe. The employment of such a valve for controlling the passage of fluid through a pipe or conduit is shown in my prior application for United States Letters Patent, Serial No. 182,334, filed November 23, 1903, of which this application is a division. A second application of the invention is shown in my copending application for United States Letters Patent, Serial No. 194,927, filed February 23, 1904, wherein the valve is employed for reducing the pressure of steam supplied to a steam-heating system. In both instances the improvements embodying the present invention are equally applicable.

As shown in the drawings, Figure 1 is a vertical section of a valve embodying my invention. Fig. 2 is a fragmentary transverse section taken on line 2 2 of Fig. 1.

As shown in the drawings, A designates, as a whole my improved valve. Said valve comprises a casing $A'$, provided on its opposite sides with branches $a\ a'$, which are adapted to be connected with the parts or sections of a conduit or pipe, through which flows a fluid the passage or pressure of which the valve is intended to control. The inlet-passage $a$ is continued inwardly to form inside of the casing a closed box-like structure $A^2$, the upper and lower walls $a^2\ a^2$ of which are provided with alined ports, through which the fluid passes from the inlet to the outlet side of the valve. Said ports are closed by upper and lower upwardly-opening valve-closures, consisting of plates $a^3\ a^3$, which fit closely in said ports and are rigidly connected by a sleeve $a^4$. Said sleeve is provided with integral radial wings $a^5$, which engage the margins of said ports when the valve is open to constitute guides for said closures at this time. Below the lowermost closure $a^3$ is a horizontal balance-disk $a^6$, which is integral with the sleeve $a^4$ and the lower guide-wings $a^5$. Said disk $a^6$ tends to equalize the kinetic force of the fluid passing through the valve and to prevent the same from overbalancing the valve in a manner tending to hold the valve open—that is to say, when the valve is opened upwardly the fluid, whether it be steam or water, passing therethrough acts on the lower face of the upper closure $a^3$ in a manner tending to hold the valve open and acts with an equal kinetic effect against the upper face of the balance-disk $a^6$ in a manner tending to hold the valve closed, thereby balancing the kinetic force of the fluid exerted against the valve-closure.

$A^{20}$ designates a diaphragm-chamber located beneath the valve-chamber, and $A^3$ designates a diaphragm within said chamber, which divides said chamber into an upper and a lower part $a^7\ a^8$, respectively.

$A^5$ is an endwise-movable valve-stem which extends upwardly through the connecting-sleeve $a^4$ of the closure and is attached at its upper end to the upper end of said sleeve and at its lower end, through the medium of a loosely-connected link $A^4$, with the diaphragm, centrally thereof. Said valve-stem $A^5$ extends upwardly through a neck $A^6$, connecting the diaphragm-chamber with the valve-casing, said neck $A^6$ being provided at its ends with flanges which are attached to the upper wall of the diaphragm-chamber and the lower wall $A^7$ of the valve-casing by means of bolts $A^8$. Said stem is connected at its upper end with the upper end of the connecting-sleeve $a^4$ by means of a cross-pin $a^8$ of the valve-closures $a^3$, and the stem extends through an opening in the bottom wall $A^7$ of the casing.

The diaphragm, as herein shown, is adapted to be acted upon at its upper and lower sides by opposing fluid columns in the manner shown in my aforesaid application, the fluid of the upper column being supplied through a pipe $a^9$ and the fluid of the lower column being supplied through a pipe $a^{10}$ in the same manner as in the construction shown in my prior applications before mentioned. The differential pressures of the fluids against the upper and lower sides of the diaphragm regulate the opening and closing movements of the closure, and thereby the passage of the fluid through the valve.

The valve-stem $A^5$ is surrounded in the sleeve $a^4$ by a packing-sleeve $A^9$, which is attached rigidly to and extends upwardly from the lower wall $A^7$ of the valve-casing before referred to. Said stem $A^5$ fits closely within the packing-sleeve $A^9$ and is provided with a number of exterior annular grooves $a^{11}$, which are adapted to be filled by the fluid, as water, from the upper side of the diaphragm-chamber, the source of which fluid is located above the level of the valve. The annular formation of said stem, taken in connection with the sleeve and the presence of the water in the packing-sleeve, constitutes between the upper part of the diaphragm-chamber and the valve-chamber a packing which prevents the passage of steam or other fluid from the valve-chamber to the upper part of the diaphragm-chamber or the passage of the fluid from the upper part of the diaphragm-chamber to the valve-chamber. The said packing-sleeve $A^9$ fits loosely within the connecting-sleeve of the closures, whereby no friction is developed between said parts during the opening and closing movements of the valve. The upper wall $A^{10}$ of the valve-casing is made removable in order to permit the ready insertion and removal of the valve-closure and packing-sleeve.

The location of the packing for the valve-stem within the connecting-sleeve $a^4$ enables the valve as a whole to be materially shortened as compared with a construction wherein the valve-stem is connected at its upper end with the lower ends of the connected valve-closures and is provided with other means for packing the stem. It is thus possible to employ a valve of a given size or of a given movement for opening and closing the same in a space which would be impracticable with a valve wherein the stem is connected at its end with the valve-closure in the manner before suggested. Moreover, the valve being shortened may be made with greater economy, it requiring less metal in its construction.

The construction of the packing between the valve-stem and the closure connecting-sleeve may be adapted to other valves than pressure-actuated valves.

Other changes in the structural details may be made without departing from the spirit of my invention, and I do not wish to be limited thereto except as hereinafter made the subject of specific claims.

I claim as my invention—

1. A pressure-controlled valve comprising a casing provided with inlet and outlet passages, a wall or bridge located between said passages and provided with a valve-port, a valve-closure for closing said port and provided with an elongated longitudinal axial passage, a diaphragm-chamber located below said casing, a neck connecting said casing with the chamber, said neck being closed at its upper end by the lower wall of the casing and in open communication at its lower end with the upper part of the diaphragm-chamber, a diaphragm in said chamber dividing the same into upper and lower parts, each of which is provided with an opening to receive a motive fluid, a stem connected at its lower end with the diaphragm and extending through said neck and through said axial passage of the closure and attached at its upper end to the upper part of said closure, and an elongated packing device fixed to the casing and fitting closely around the part of the stem within said axial passage.

2. A pressure-controlled valve comprising a casing provided with inlet and outlet passages, a wall or bridge located between said passages provided with a valve-port, a valve-closure for closing said port and provided with an elongated axial passage, a diaphragm-chamber located below said casing and connected therewith by a neck which is in open communication with the upper part of the diaphragm-chamber, a diaphragm in said chamber dividing the same into upper and lower parts, each of which is provided with an opening to receive a motive fluid, a valve-stem connected at its lower end with the diaphragm and extending through said neck and through said axial passage of the closure and attached at its upper end to the upper part of said closure, and a packing for said stem within said axial passage comprising a plurality of annular exterior grooves on said stem, and a sleeve fixed to the casing and extending through said axial passage and in which said grooved stem closely fits.

3. A pressure-controlled valve comprising a casing provided with inlet and outlet passages for connection with a pipe or conduit, a bridge or wall located between said passages and provided with a valve-port, a closure for said port provided with an elongated, axial passage, a packing-sleeve, fixed to the lower wall of the casing and extending upwardly through said axial passage, a valve-stem extending upwardly through said packing-sleeve, and connected at its upper end with the upper end of the valve-closure, the sleeve and stem being constructed and arranged to provide a fluid-tight packing for said stem, a diaphragm-chamber located below said casing and connected therewith by a hollow neck which is fixed to the lower wall of the valve-casing and is in open communication with the upper part of the diaphragm-chamber, and a diaphragm within the chamber to which is connected the lower end of said stem, the parts of said diaphragm-chamber above and below the diaphragm being provided with openings to receive a motive fluid.

4. A pressure-controlled valve comprising a casing provided with inlet and outlet passages, one of the passages being continued into the casing to constitute a chamber provided in its upper and lower walls with alined valve-ports, an elongated closure having two separated disks for closing said ports, and provided with a longitudinal, axial passage, a diaphragm-chamber located below the casing, a diaphragm in said chamber dividing it into upper and lower parts, a neck connecting said casing with the diaphragm-chamber and fixed at its upper end to the lower wall of the casing and in open communication at its lower end with the upper part of the diaphragm-chamber, a packing-sleeve rising from said lower wall of the casing into said axial passage of the closure, and a stem connected at its lower end with the diaphragm and extending through said neck and through said packing-sleeve and fixed at its upper end to the upper end of the closure, said stem and packing-sleeve being arranged to provide within said axial passage an elongated packing for said valve-stem.

In testimony that I claim the foregoing as my invention I affix my signature, in presence of two witnesses, this 19th day of May, A. D. 1904.

EUGENE F. OSBORNE.

Witnesses:
   W. L. HALL,
   GERTRUDE BRYCE.